April 11, 1950     H. W. ZIMMERMAN     2,503,649
TORQUE TESTER
Filed June 4, 1945
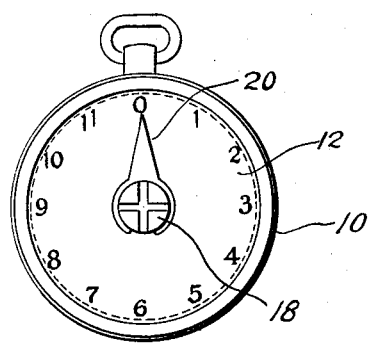
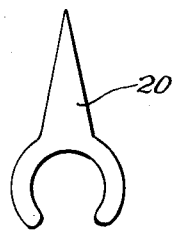
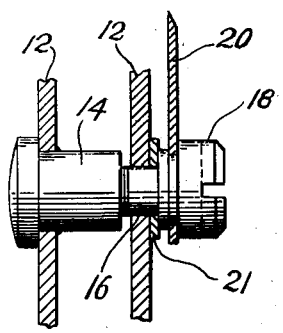
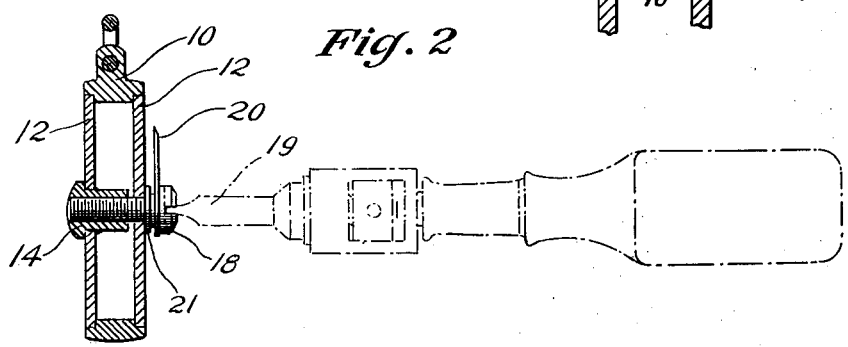
INVENTOR
H. W. Zimmerman
BY Joseph K. Schofield
ATTORNEY Patented Apr. 11, 1950

2,503,649

UNITED STATES PATENT OFFICE 2,503,649

TORQUE TESTER

Herman W. Zimmerman, North Newington, Conn.; Sylvia V. M. Zimmerman, administratrix of said Herman W. Zimmerman, deceased, assignor of one-third to Sylvia V. M. Zimmerman and two-thirds to Ada Z. Shade, Crystal Lake, Ill.

Application June 4, 1945, Serial No. 597,419

4 Claims. (Cl. 73—1)

1

This invention relates to torque testing equipment and particularly to a small manually operated testing device designed primarily for setting and from time to time testing the adjustment of torque wrenches, screw drivers, and the like.

An object of the present invention is to provide a convenient, easily carried and operated testing device for torque tools which will enable the adjustment of a torque tool to be indicated in inch pounds, angular rotation, or the direct load in pounds stress per square inch on the threaded or other member being tested.

A feature that enables the above object to be accomplished is that a threaded member is turned about its axis by the torque tool or other member being adjusted or tested and forces toward each other two plate-like members, preferably in the form of similar thin metal discs forming opposite faces of the device, the amount of compressive movement of these members being proportional to the load applied by the tool being tested and indicated by a pointer rotated with the tool being tested or adjusted movable over a graduated dial.

Another feature that is important is that an indicator pointer or hand preferably frictionally mounted on the rotatable threaded member is movable over a graduated scale or dial provided directly on one of the compressive or flexible discs and calibrated to read in inch-pounds or any other preferred unit.

With the above and other objects in view the invention may include the features of construction and operation set forth in the following specification and illustrated in the accompanying drawing.

In the accompanying drawing annexed hereto and forming a part of this specification, I have shown the invention embodied in a circular casing having similar opposed thin discs on opposite sides thereof non-rotatably supported, but it will be understood that the invention can be otherwise embodied and that the drawing is not to be construed as defining or limiting the scope of the invention, the claims appended to this specification being relied upon for that purpose.

In the drawing:

Figure 1 is a front elevation of a torque tester made in accordance with the present invention.

Fig. 2 is a central transverse sectional view through the torque tester shown in Fig. 1, a torque screw driver being shown in position for testing.

Fig. 3 is a fragmentary view of some of the parts shown in Fig. 2 drawn upon an enlarged scale to more clearly show their construction, and Fig. 4 is a detached view of the indicating pointer used in the device shown upon the same scale as Fig. 3.

In the above mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a circular or annular casing; second, opposed thin metal discs non-rotatably mounted as the side walls thereof; third, a screw threaded member secured against rotation centrally within one of said discs; fourth, a meshing threaded member rotatably supported centrally within the opposite disc and having means for engaging a torque tool being tested; fifth, graduations on one of said discs; and sixth, a pointer mounted on the rotatable threaded member movable over said scale.

Referring more in detail to the figures of the drawing, a casing shell 10 of annular form is provided with a suitable seat or rabbet on each side fitting the periphery of a thin circular metal disc 12. One disc 12 is provided with an internally threaded member 14 secured against rotation in the central portion of the disc. The opposite disc 12 is provided at its center with an externally threaded member 16 rotatable relatively to the disc and engaging the threads of members 14. At the outer end of member 16 is a head 18 provided with slots or other engaging means within which the end of a torque tool 19 may be inserted. The head 18 may also be formed to fit any form of torque tool in a manner permitting the tool to rotate the screw 16 within member 14.

Between the head 18 of screw 16 and the outer surface of the front plate or disc 12 is a bearing washer 21 of hardened steel or other metal carefully surfaced to give a uniform friction when screw 16 is turned.

On this screw 16 closely adjacent the disc 12 is a frictionally retained indicator pointer or hand 20. As shown, the portion of the pointer 20 fitting the shank of screw 16 is adapted to snap over the shank and resiliently engage the screw and retain the pointer 20 in any adjusted position.

Rotation of screw 16 in one direction by a torque wrench or other tool draws the discs 12 toward each other, the pressure of which varies with the deflection of the discs. To establish a maximum pressure that may be used to draw the discs together the internally threaded member 14 is extended to closely adjacent the inner face of the opposite disc 12. For convenience this distance may be sufficient to apply a definite maximum limiting pressure upon the discs 12 and upon the screw threaded members 14 and 16 prior to the end of threaded member 14 contacting the inner surface of the disc 12.

On the front disc 12 over which passes the pointer 20 there may be provided a series of graduations calibrated to indicate definite forces in any preferred units such as inch-pounds, applied to a tool to rotate the screw 16 or in any units of stress applied directly to the threaded member 16.

To adjust the tester in service or to test the accuracy of the pointer indications, the screw 16 is turned to draw the two opposed plates or discs 12 together until the end of threaded member 14 abuts against the inner surface of the front disc 12. The pointer is then moved to its maximum reading. After backing off the screw 16 the tester will be ready for use.

I claim as my invention:

1. A torque tester comprising in combination, a casing shell, a pair of compressible discs mounted thereon in spaced parallel relation, a threaded member secured to one of said discs, a rotatable threaded member mounted on the other disc and engaging said first mentioned threaded member, a head on said rotatable member abutting the outside surface of the second of said discs, said rotatable threaded member acting when rotated to deflect said discs, means to indicate the amount of rotation of said rotatable threaded member, and engaging means on said head for a tool being tested.

2. A torque tested comprising in combination, a casing shell, a pair of compressible discs mounted thereon in spaced parallel relation, a threaded member secured to one of said discs, a rotatable threaded member mounted in the other disc and engaging said first threaded member, a head on said rotatable threaded member abutting the outside surface of the second mentioned disc, said rotatable threaded member acting when rotated to deflect said discs, means on said first mentioned threaded member to limit deflection of said discs, means mounted on said rotatable member to indicate the amount of rotation of said member, and means on said head for operatively engaging a tool being tested.

3. A torque tester comprising in combination, a casing shell, opposed discs mounted thereon in spaced parallel relation one of which is flexible, a threaded member secured in position centrally of one of said discs, a second threaded member engaging said first threaded member and rotatably secured centrally of the opposite disc, a head thereon bearing against the outer surface of said latter disc, means on said rotatable threaded member for engaging a tool being tested, whereby when said rotatably mounted threaded member is rotated one of said discs will be resiliently forced toward the other and means to indicate the amount of deflection of said flexible disc.

4. A torque tester comprising in combination, a casing shell, opposed flexible discs mounted thereon in spaced parallel relation, a threaded member secured in position centrally of one of said discs, a second threaded member engaging said first threaded member and rotatably mounted centrally of the opposite disc and having a head bearing against its outer face, means on said first threaded member to limit the movement of said discs toward each other, graduations on one of said discs, an indicator rotated with said second threaded member and adjacent said graduations, and means on said head for operatively engaging a tool being tested.

HERMAN W. ZIMMERMAN.

REFERENCES CITED

The following references are of record in the file of this patent:

UNITED STATES PATENTS

| Number | Name | Date |
|---|---|---|
| 2,244,185 | Bakewell | June 3, 1941 |
| 2,272,610 | Kreiger et al. | Feb. 10, 1942 |
| 2,281,226 | Boles | Apr. 28, 1942 |
| 2,342,919 | Chapman | Feb. 29, 1944 |
| 2,357,643 | Floyd | Sept. 5, 1944 |
| 2,363,347 | Mars | Nov. 21, 1944 |

FOREIGN PATENTS

| Number | Country | Date |
|---|---|---|
| 454,443 | Great Britain | Oct. 1, 1936 |